(12) United States Patent
Lin et al.

(10) Patent No.: US 12,548,620 B2
(45) Date of Patent: Feb. 10, 2026

(54) MEMORY DEVICE AND OPERATING METHOD THEREOF

(71) Applicant: TAIWAN SEMICONDUCTOR MANUFACTURING COMPANY, LTD., Hsinchu (TW)

(72) Inventors: Yu-Wei Lin, Taichung (TW); Meng-Sheng Chang, Hsinchu County (TW); Shao-Yu Chou, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 94 days.

(21) Appl. No.: 18/658,128

(22) Filed: May 8, 2024

(65) Prior Publication Data

US 2025/0349354 A1    Nov. 13, 2025

(51) Int. Cl.
  *G11C 13/00* (2006.01)
(52) U.S. Cl.
  CPC ...... *G11C 13/0026* (2013.01); *G11C 13/0038* (2013.01)
(58) Field of Classification Search
  CPC .................... G11C 13/0026; G11C 13/0038
  See application file for complete search history.

(56) References Cited

U.S. PATENT DOCUMENTS

| | | | | |
|---|---|---|---|---|
| 2006/0284658 A1* | 12/2006 | Wright | ............... | H03K 17/163 327/170 |
| 2008/0123393 A1* | 5/2008 | Kinoshita | ........... | G11C 11/5685 365/189.16 |
| 2021/0028229 A1* | 1/2021 | Zhang | ................. | H10B 63/00 |
| 2022/0076742 A1 | 3/2022 | Kim | | |
| 2022/0262434 A1* | 8/2022 | Nguyen | ............ | G11C 13/0097 |
| 2023/0154531 A1 | 5/2023 | Sekar et al. | | |

FOREIGN PATENT DOCUMENTS

TW    202205113 A    2/2022

* cited by examiner

*Primary Examiner* — Jay W. Radke
(74) *Attorney, Agent, or Firm* — Maschoff Brennan

(57) ABSTRACT

A memory device is provided and including a memory array including multiple memory cells each including a memory unit; and a first number of first transistors coupled in series between the memory unit and a first voltage terminal. The memory device further includes a voltage generating circuit coupled between the memory array and a second voltage terminal. The voltage generating circuit includes multiple voltage divider circuits each including a second number of second transistors coupled in series to a corresponding one in multiple data lines to a corresponding column of the memory cells.

20 Claims, 15 Drawing Sheets

MEMORY DEVICE AND OPERATING METHOD THEREOF

BACKGROUND

Near-memory compute memory device, designed to enhance energy efficiency by performing computations close to memory storage, requires high supply voltage for enlarging sampling range and reducing noise interference of the result of compute-in-memory operations, which raises concerns of the reliability of header circuits in the memory device that coupled to the high voltage.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
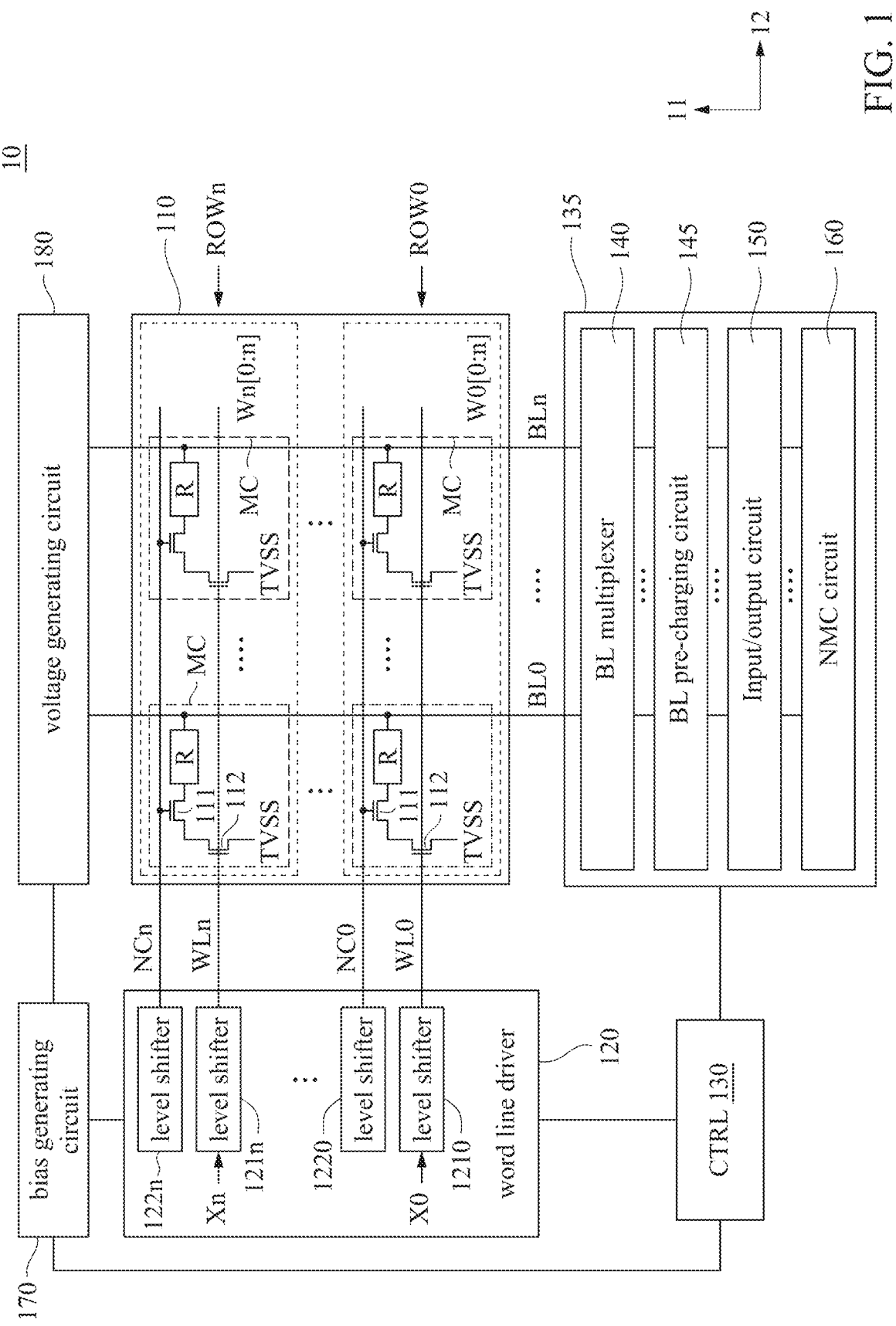
FIG. 1 is a schematic diagram of a memory device in accordance with some embodiments of the present disclosure.

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. The term mask, photolithographic mask, photomask and reticle are used to refer to the same item.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

In some embodiments of the present application, a memory device including stacked active elements (e.g., metal-oxide-semiconductor field-effect transistors (MOS)) coupled between a supply voltage terminal and a memory array. In a compute-in-memory (CIM) operation, the stacked transistors implemented as voltage divider circuits to keep voltages across transistors in a voltage range of good reliability of the memory device. Furthermore, memory cells of the memory array include series-coupled transistors that divide voltage across the memory cells, providing protection for the memory cells from high voltage stress caused by the supply voltage terminal. With the configurations of the present application, higher sampling voltage is utilized in the memory device, and accordingly, improved noise resistance of the signals indicating results of CIM operation and broader sampling range are provided.

Reference is now made to FIG. 1. FIG. 1 is a schematic diagram of a memory device 10 in accordance with some embodiments of the present disclosure. In some embodiments, the memory device 10 is configured as a CIM system for neural network operations. For illustration, the memory device 10 includes a memory array 110, a word line driver 120, a control circuit 130, a read circuit 135, a bias generating circuit 170, and a voltage generating circuit 180. In some embodiments, the read circuit 135 includes a bit line multiplexer 140, a bit line pre-charging 145, an input/output circuit 150, and a near-memory-compute (NMC) circuit 160. In some embodiments, the NMC circuit operates as an adder circuit.

The memory array 110 made up of multiple bitcells is referred to as memory cells MC. The memory cells MC are at the intersection of a row along direction 12 with a column along direction 11 in the 110. In some embodiments, the memory array 110 can be non-volatile memory array and includes resistive-based random access memory (RAM) cells. Resistive-based RAM can include resistive-RAM (Re-RAM), magnetoresistive RAM (MRAM), ferroelectric RAM (FeRAM), dielectric RAM, phase-change memory (PCRAM), fuse type memory (e.g., Anti-fuse), any suitable array of any suitable memory devices, or combinations thereof.

As illustratively shown in FIG. 1, the memory cell MC includes a number N1 of transistors 111-112 that are coupled in series with a memory unit R between a voltage terminal TVSS and a corresponding bit line, e.g., one of the bit lines BL0-BLn. In some embodiments, the bit lines BL0-BLn are referred to as data lines that transmit a result of a compute-in-memory (CIM) operation of the memory device 10. In the embodiments of FIG. 1, the transistors 111-112 are N-type MOS, and the voltage terminal TVSS is a ground.

In some embodiments, the memory array 110 is configured to store multiple weights accessed for a neural network. For example, as shown in FIG. 1, n bits of weight data W0-Wn are stored in corresponding rows, in which each bit in the weight data stored in a certain memory cell in a row.

Specifically, the memory unit R has a first terminal coupled to a corresponding bit line and a second terminal coupled to a first terminal (e.g., a drain/source terminal) of the transistor 111. A second terminal (e.g., a source/drain terminal) of the transistor 111 is coupled to a first terminal (e.g., a drain/source terminal) of the transistor 112, and a second terminal (e.g., a source/drain terminal) of the transistor 112 is coupled to the voltage terminal TVSS. A control terminal (e.g., gate terminal) of the transistor 111 is coupled to corresponding one in control signals NC0-NCn, and a control terminal (e.g., gate terminal) of the transistor 112 is coupled to corresponding one in the word lines WL0-WLn.

The word line driver (WLDR) 120 is coupled to rows of memory cells MC in the memory array 110 through word lines WL0-WLn, and is configured to generate word line signals to drive the word lines WL0-WLn for accessing the memory array 110 to read/write bits from/into the memory array 110 in response to control signal associated with addresses, in which the addresses indicate some specific memory cells, storing bits, in the memory array 110. Specifically, in some embodiments, the word line driver 120 selects and activates the specific memory cells in the memory array 110 according to the addresses.

As shown in FIG. 1, the word line driver 120 includes level shifters 1210-121n and level shifters 1220-122n. In some embodiments of the CIM operation, the transistors 111 are turned on in response to control signals NC0-NCn generated by the level shifters 1220-122n. A computation operation (also referred to as a multiply-and-accumulation (MAC) operation) is performed by each of the level shifters 1210-121n generating a corresponding word line signal on a word line according to a received input data (one of input data X0-Xn) to turn on or turn off the transistor 112. For example, in some embodiments, the level shifter 1210 generates a word line signal having a high logic state in response to an n-th bit X0[n] of the input data X0 having bit value "1". Then, each memory cell MC generates an output current according to a weight bit store therein and the word line signal associated with the input data. Each of memory cells MC in a same column outputs a current to a corresponding one in the bit lines BL0-BLn.

For example, in some embodiments, when Xn[n] is "0," the transistor 112 of N-type MOS being turned off in response to the word line signal having low logic state, no current is output by the memory cell MC regardless the bit value of the weight data stored therein. Alternatively stated, result of the MAC operation of the input data Xn[n] and the weight data contributes none to an ultimate output result data of MAC operation of input data X0-Xn and weight data W0-Wn, which is referred to as "0."

Furthermore, in some embodiments, stored bit value (e.g., Wn[0]) of the weight data is "0," corresponding to a high resistance RH state. When Xn[n] is "1" and the transistor 112 of N-type MOS being turned on in response to the word line signal having high logic state, a small current, for example, around 1 uA, is output by the memory cell MC. Due to the relatively neglectable small current, result of MAC operation of the input data Xn[n] and the weight data contributes none to the ultimate output result data, which is referred to as "0."

In contrast, in some embodiments, stored bit value (e.g., Wn[0]) of the weight data is "1," corresponding to a low resistance RL state. When Xn[n] is "1" and the transistor 112 of N-type MOS being turned on in response to the word line signal having high logic state, a larger current, for example, around 1 mA, is output by the memory cell MC, and accordingly, result of this MAC operation of the input data Xn[n] and the weight data Wn[0] is referred to as "1."

Accordingly, the read circuit 135 accumulates sum currents of each bit line and generates an output result data of MAC operation of the CIM operation to the input data X0-Xn and weight data W0-Wn.

The control circuit 130 is configured to control the word line driver 120, the read circuit 135, the bias generating circuit 170 and voltage generating circuit 180 to perform either traditional memory access (e.g., read and write of specific addresses), as well as CIM operation. In some embodiments, the control circuit 130 includes an x-decoder for the word lines and a y-decoder for the bit lines and/or sensing lines. It also contains timing control for read, write, and computation operations.

The bit line multiplexer (MUX) 140 of the read circuit 135 is coupled to the memory 101 and is configured to enable columns of the memory array 110 by selecting the bit line (BL) and/or sense line based on the control signal from the control circuit 130.

In some embodiment, the bit line pre-charging circuit 145 in memory access precharges the bit lines for read operations.

The input/output (IO) circuit 150 is configured to transmit data to be written into the memory array 110 and/or to readout data stored in the memory array 110. For example, the input/output circuit 150 transmits weights to be stored in the memory array 110 to the memory array 110 in write operation and output the sum current from the memory array 110 to the NMC circuit. In some embodiments, the input/output circuit 150 includes sense amplifier circuits for input/output operations from the memory array 110.

The bias generating circuit 170 is configured to generate voltages and control signals to the word line driver 120 and voltage generating circuit 180 during memory operations (e.g., read, write, computation operation.) The voltage generating circuit 180 is configured to provide voltages to bit lines BL0-BLn based on the memory operations. The detailed configurations of the bias generating circuit 170 and the voltage generating circuit 180 are discussed in the following paragraphs.

Figure 2:
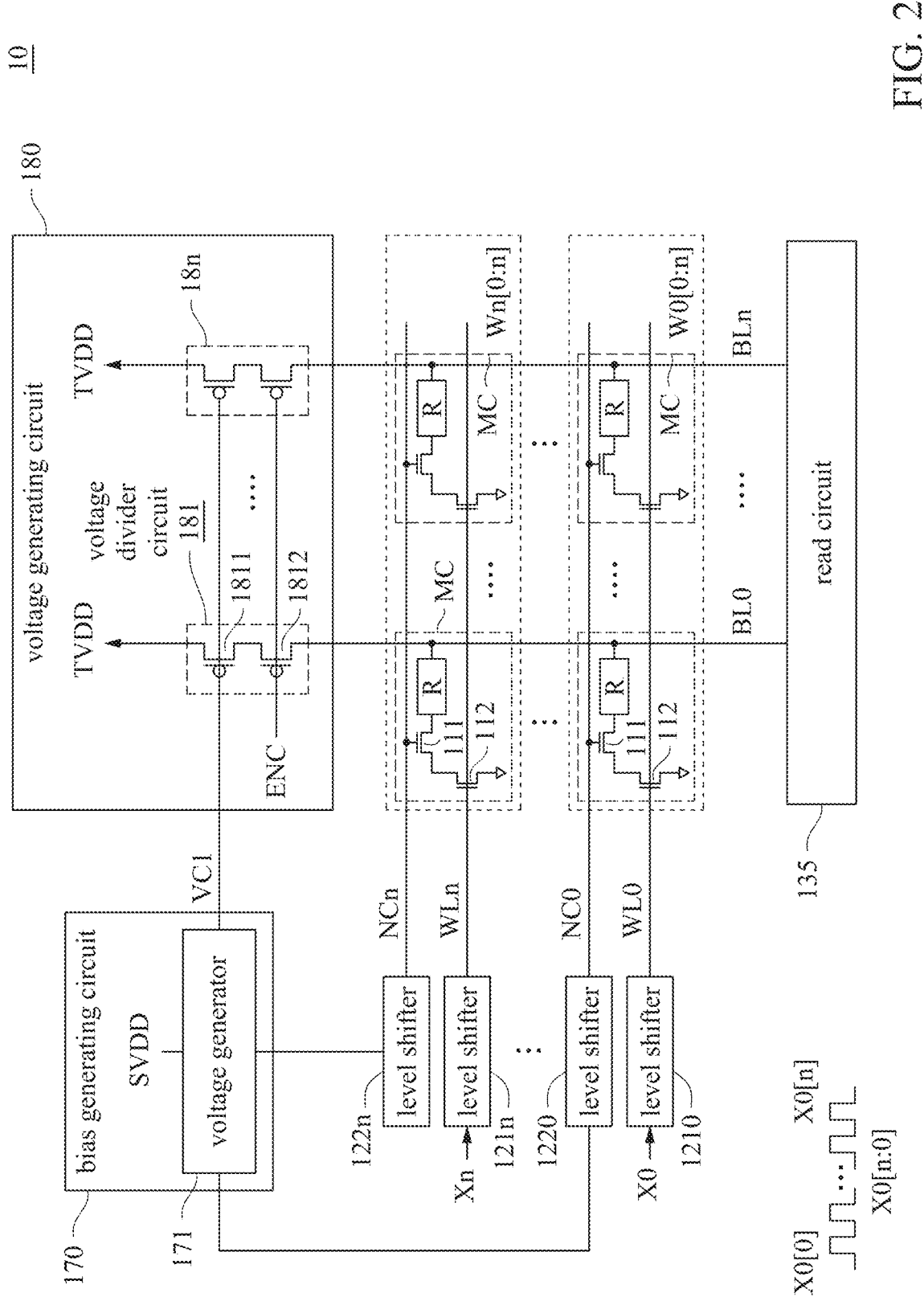
FIG. 2 is a schematic diagram of a memory device corresponding to the memory device shown in FIG. 1, in accordance with some embodiments of the present disclosure.

Reference is now made to FIG. 2. FIG. 2 is a schematic diagram of a memory device corresponding to the memory device 10 shown in FIG. 1, in accordance with some embodiments of the present disclosure. With respect to the embodiments of FIG. 1, like elements in FIG. 2 are designated with the same reference numbers for ease of understanding. The specific operations of similar elements, which are already discussed in detail in above paragraphs, are omitted herein for the sake of brevity.

As illustratively shown in FIG. 1, the bias generating circuit 170 includes a voltage generator 171. In some embodiments, the voltage generator 171 is configured to generate a control signal VC1 to the level shifters 1220-122n and the voltage generating circuit 180 according to the voltage signal SVDD. In some embodiments, the voltage signal SVDD swings between a supply voltage VDD1 and a ground potential in the operation. In some embodiments, the voltage generator 171 and the level shifters 1220-122n are in a middle voltage domain MVDD while the level shifters 1210-121n in a low voltage domain and output signals swing between the ground potential and a voltage below the VDD, for example, equal to half of VDD1. In some embodiments, the control signal VC1 has a voltage level different from the voltage signal SVDD. In various embodiments, the voltage level of the control signal VC1 is lower than the supply voltage VDD1.

The voltage generating circuit 180 is coupled between the memory array 110 and a voltage terminal TVDD that provides the supply voltage VDD1. The voltage generating circuit 180 includes voltage divider circuits 181-181n. Each of the voltage divider circuits 181-181n include a number N2 of transistors, for example, 1811-1812, that are coupled in series to a corresponding one in the multiple bit lines BL0-BLn and further to a corresponding column of memory cells MC. In some embodiments, the transistors 1811 and 1812 are of a same conductivity type, for example, P type, as shown in the embodiments of FIG. 2. In some embodiments, the number N2 is equal to the number N1 that corresponds to a number of transistors 111-112 in the memory cell MC.

Specifically, each of the transistors 1811 is coupled between the voltage terminal TVDD and the transistor 1812. The transistors 1811 are configured to operate in response to the control signal VC1 received by the control terminals thereof. The transistors 1812 are configured to operate in response to a control signal ENC that is different from the control signal VC1.

Figure 3A:
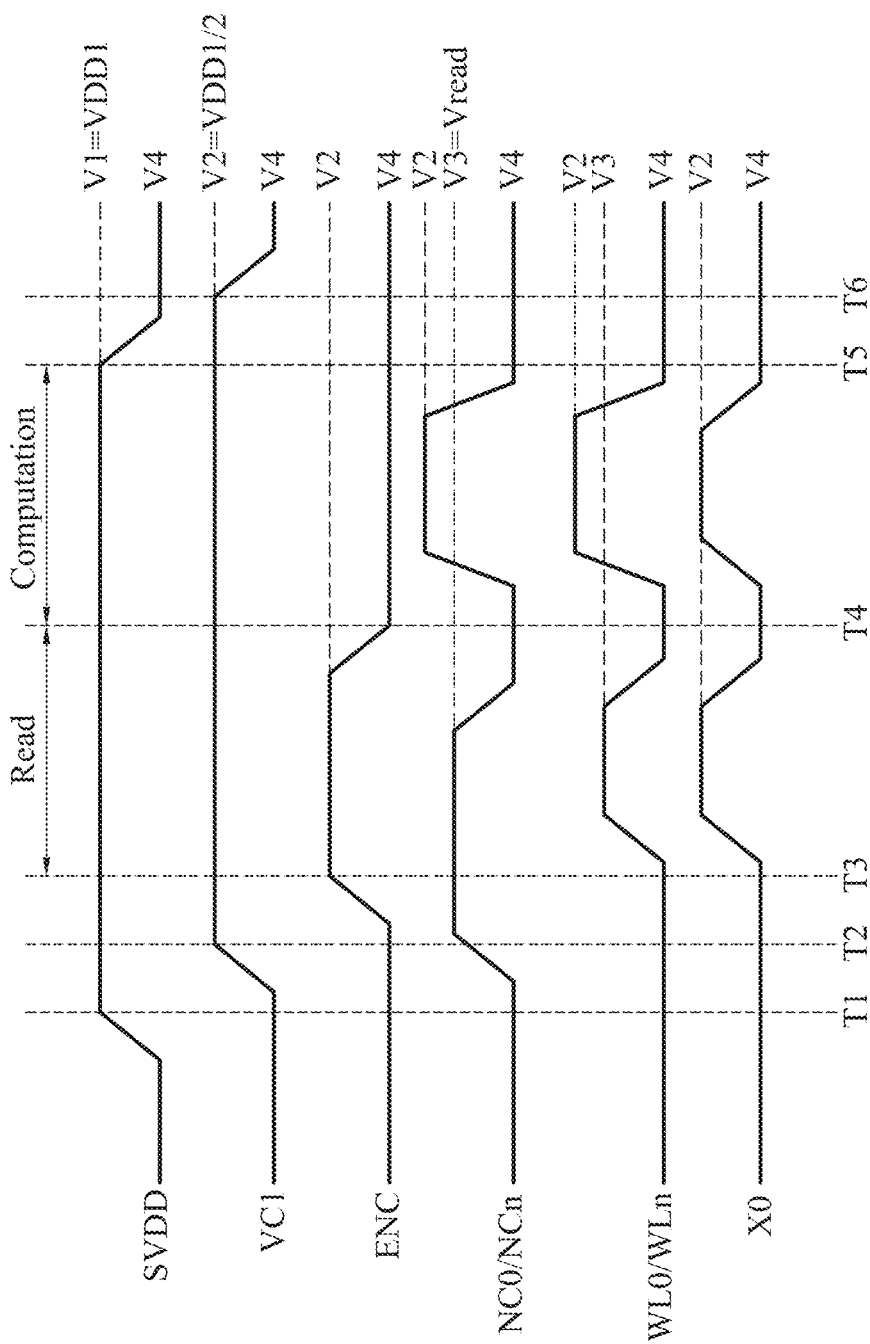
FIG. 3A is a waveform diagram illustrating signals and voltage corresponding to FIGS. 1-2 in operation, in accordance with some embodiments of the present disclosure.

Reference is now made to both FIG. 2 and FIG. 3A, in which FIG. 3A is a waveform diagram illustrating signals and voltage corresponding to FIGS. 1-2 in operation when an input bit of the input data is "1", in accordance with some embodiments of the present disclosure.

At time T1, the voltage signal SVDD having a voltage V1 equal to the supply voltage VDD1 is provided to the bias generating circuit 170 of FIG. 2.

At time T2, the bias generating circuit 170 generates the control signal VC1 having a voltage V2 equal to half of the supply voltage VDD1 to the gate terminal of the transistors 1811 in the voltage generating circuit 180, and accordingly, provides a voltage, equal to VDD1/2, across gate and source/drain terminals of the transistors 1811. In some embodiments, the voltage V2 is greater than the threshold voltage of the transistor 1811 to conduct the transistor 1811 and smaller than an upper limitation of normal function voltage of the transistor 1811, which ensures the reliability of the transistor 1811. In some embodiments, as shown in FIG. 3A, the control signal VC1 remains the voltage V2 in both the read operation of weight data and the computation operation from time T3 to time T5.

Furthermore, the level shifters 1220-122n generates the control signals NC0-NCn to have a voltage V3 equal to a read voltage Vread for the read operation. In some embodiments, the read voltage Vread is smaller than the supply voltage VDD1 and the voltage V2.

During time T3 to time T4, the control circuit 130 rises the control signal ENC to have the voltage V2 based on the read operation of the memory device 10, and accordingly turns off the transistors 1812 in the voltage generating circuit 180 to disconnect the voltage terminal TVDD from the bit lines BL. In the read operation of a certain memory cell, the corresponding one in the level shifters 1210-121n generates a word line signal to the word line coupled to the memory cell to be read based on the address of the selected memory cell. The selected memory cell MC is accessed by turning on the transistors 111-112 in response to a corresponding one in the control signal NC0-NCn and a corresponding one in the word line signals on the word lines WL0-WLn, in which the word line signal has the read voltage V3. Accordingly, the weight data in the memory cell MC is transmitted to the read circuit 135.

For the computation operation in time T4 to time T5, all the memory cell MC in the memory array 110 are accessed together at the same time to generate the MAC of the input data X0-Xn and the weight data W0-Wn. Specifically, in some embodiments, the control circuit 130 pulls down the control signal ENC to the ground potential to turn on the P-type transistors 1812 to transmit the supply voltage VDD1 provided by the voltage terminal TVDD to the bit lines BL0-BLn. Taking a bit data of the input data X0 having a high logic value "1" as example in FIG. 3A, the level shifter 1210 further generates word line signal on the word line WL0 to have the voltage V2. Accordingly, as previously discussed with respect to FIG. 1, the memory cell MC generates an output current to a corresponding bit line according to the bit data of the input data X0 and stored bit value of the weight data.

With reference to both FIG. 2 and FIG. 3A together, in the computation operation, the absolute values of voltages across gate and source/drain terminals of each of the transistors 111-112 and 1811-1812 are the same, which equal to the voltage V2 (i.e., VDD1/2). For example, the voltage, VDD1/2, of the control signal WL0 to the gate of the transistor 112 is the same as a voltage difference, VDD1/2, between the voltage (VDD1) of the bit line BL0 and the voltage (VDD1/2) of the control signal NC0 transmitted to the gate of the transistor 111. The voltage, VDD1/2, of the control signal ENC to the gate of the transistor 1812 is the same as a voltage difference, VDD1/2, between the voltage (VDD1) at the voltage terminal TVDD and the voltage (VDD1/2) of the control signal VC1 transmitted to the gate of the transistor 1811. The absolute values of the voltage across gate and source/drain terminals of each of the transistors 111-112 and 1811-1812 are further smaller than the upper limitation of normal function voltage of the transistor 1811. Accordingly, excellent reliability of the memory device 10 is provided.

Furthermore, the read circuit 135 digitalizes voltage, corresponding to the sum current, to generate m bits of output result of the input data X0-Xn and the weight data W0-Wn in the CIM operation. Based on the aforementioned configurations, the sum current—a sum of currents in the bit lines BL0-BLn—is associated with the voltage at the voltage terminal TVDD. Accordingly, the higher the voltage, for example, VDD1, provided by the voltage terminal TVDD, higher noise tolerance or higher resolution is achieved.

For example, when the voltage VDD1 is around 1.92 Volts and the read circuit 135 generates 2-bit output result, every 480 mV in the voltage of the sum current correspond to a bit value in the output result, as shown in the Table I below:

TABLE I

| Voltage range | Output result |
| --- | --- |
| 0~480 mV | 00 |
| 481 mV~960 mV | 01 |
| 961 mV~1440 mV | 10 |
| 1441 mV~1920 mV | 11 |

In some approaches, the voltage provides to the bit line is around 0.96 Volts and every 240 mV in the voltage of the sum current correspond to a bit value in the output result. Compared with the aforementioned approaches, the present application provides double margin for each bit value, accordingly, significant noise tolerance is provided when noise signals (e.g., having voltage swing of several mV) influence the bit line BL.

In another embodiments, when the voltage VDD1 is around 1.92 Volts and the read circuit 135 generates 3-bit output result, every 240 mV in the voltage of the sum current correspond to a bit value in the output result, as shown in the Table II below:

TABLE II

| Voltage range | Output result |
| --- | --- |
| 0~240 mV | 000 |
| 241 mV~480 mV | 001 |
| 481 mV~720 mV | 010 |
| 721 mV~960 mV | 011 |
| 961 mV~1200 mV | 100 |
| 1201 mV~1440 mV | 101 |
| 1441 mV~1680 mV | 110 |
| 1681 mV~1920 mV | 111 |

In some approaches, the voltage provides to the bit line is around 0.96 Volts and every 240 mV in the voltage of the sum current correspond to a bit value in the output result, which generates 2-bit output result. Compared with the aforementioned approaches, the present application provides larger sampling range for voltage on bit lines, and hence, greater resolution of output result is provided, improving CIM operation of the memory device 10.

With continued reference to FIG. 3A, after time T5, the voltage signal SVDD drops to the ground potential and further pulls down the control signal VC1.

The configurations of FIG. 3A are given for illustrative purposes. Various implements are within the contemplated scope of the present disclosure. For example, in some embodiments, the value of the supply voltage VDD1 can be any other proper number.

Figure 3B:
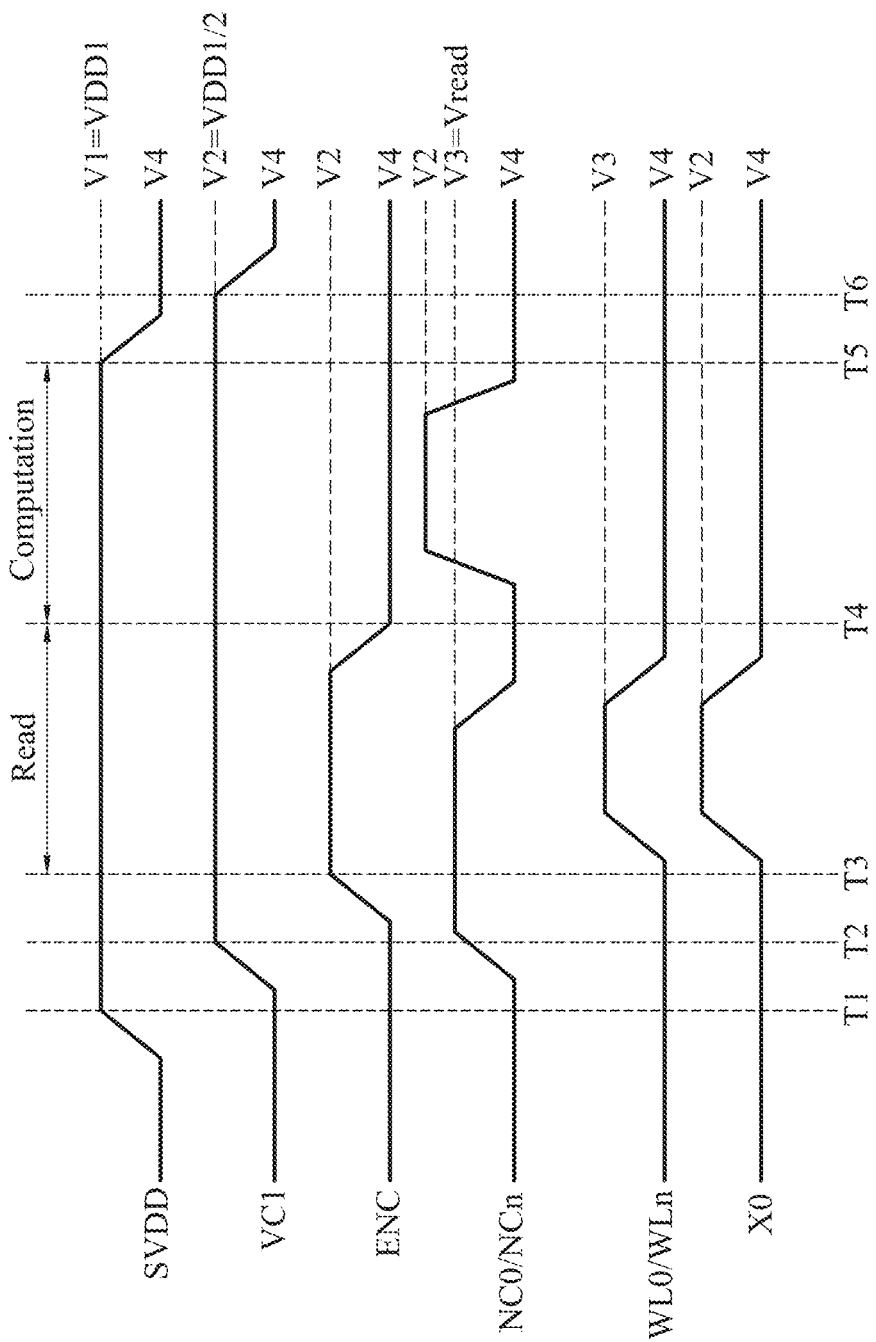
FIG. 3B is a waveform diagram illustrating signals and voltage corresponding to FIGS. 1-2 in operation, in accordance with some embodiments of the present disclosure.

Reference is now made to FIG. 3B. FIG. 3B is a waveform diagram illustrating signals and voltage corresponding to FIGS. 1-2 in operation when an input bit of the input data is "0", in accordance with some embodiments of the present disclosure.

Compared with FIG. 3A, the input bit of the input data is "0," and accordingly the corresponding word line signal generated based on the input bit has a ground potential, turning off the transistor 112 of FIG. 2.

Figure 4:
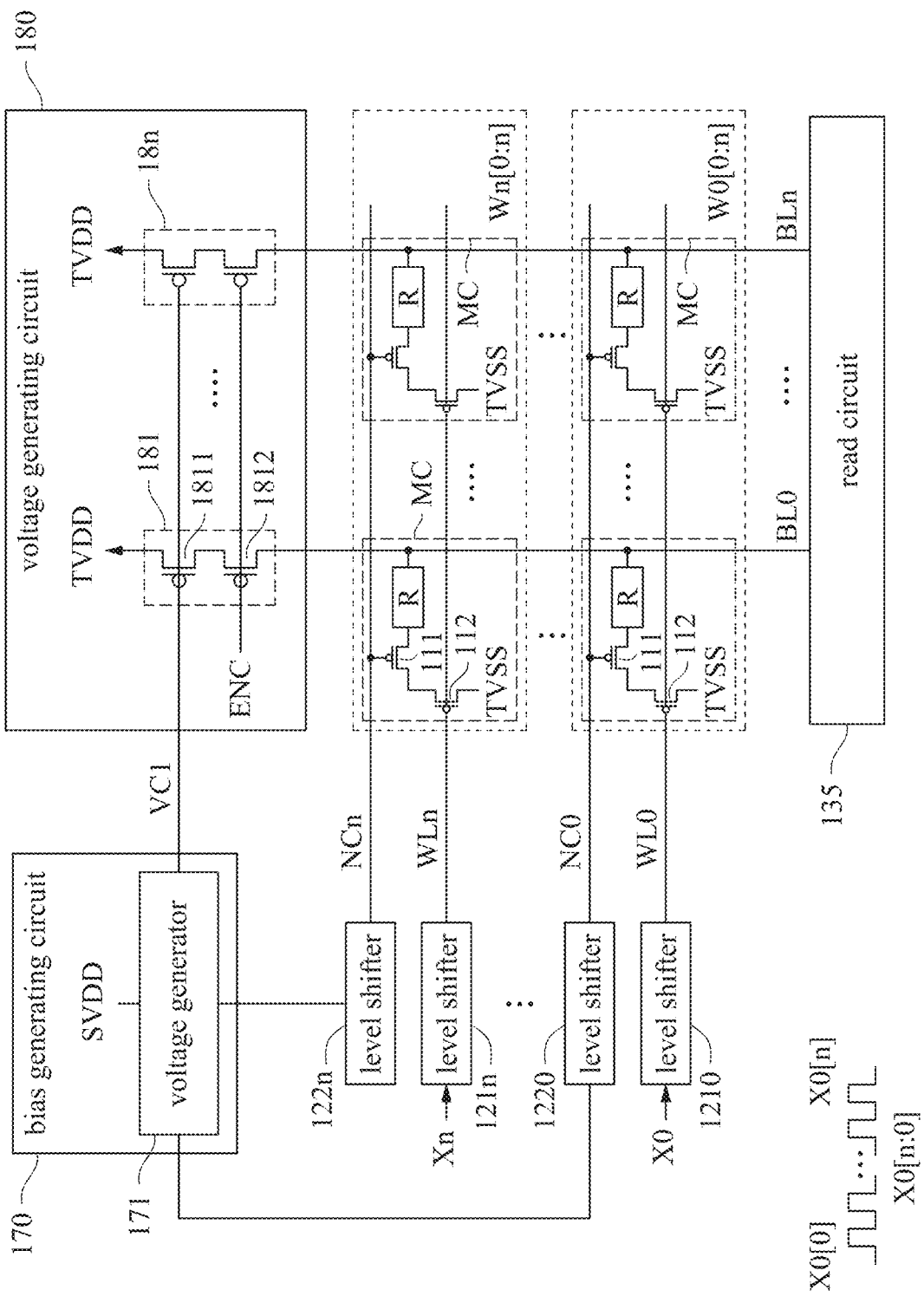
FIG. 4 is a schematic diagram of a memory device corresponding to the memory device, in accordance with some embodiments of the present disclosure.

Reference is now made to FIG. 4. FIG. 4 is a schematic diagram of a memory device 40, in accordance with some embodiments of the present disclosure. With respect to the embodiments of FIGS. 1-3B, like elements in FIG. 4 are designated with the same reference numbers for ease of understanding. In some embodiments, the memory device 40 is configured with respect to, for example, the memory device 10 of FIG. 1.

Compared with the memory device 10 in FIGS. 1-2, the transistors 111-112 in the memory array 110 of the memory device 40 are P-type transistors. In some embodiments of FIG. 4, the voltage signal SVDD is transmitted to the level shifters 1210-121n and the level shifters 1220-122n to provide the supply voltage VDD1 in the computation operation.

Figure 5:
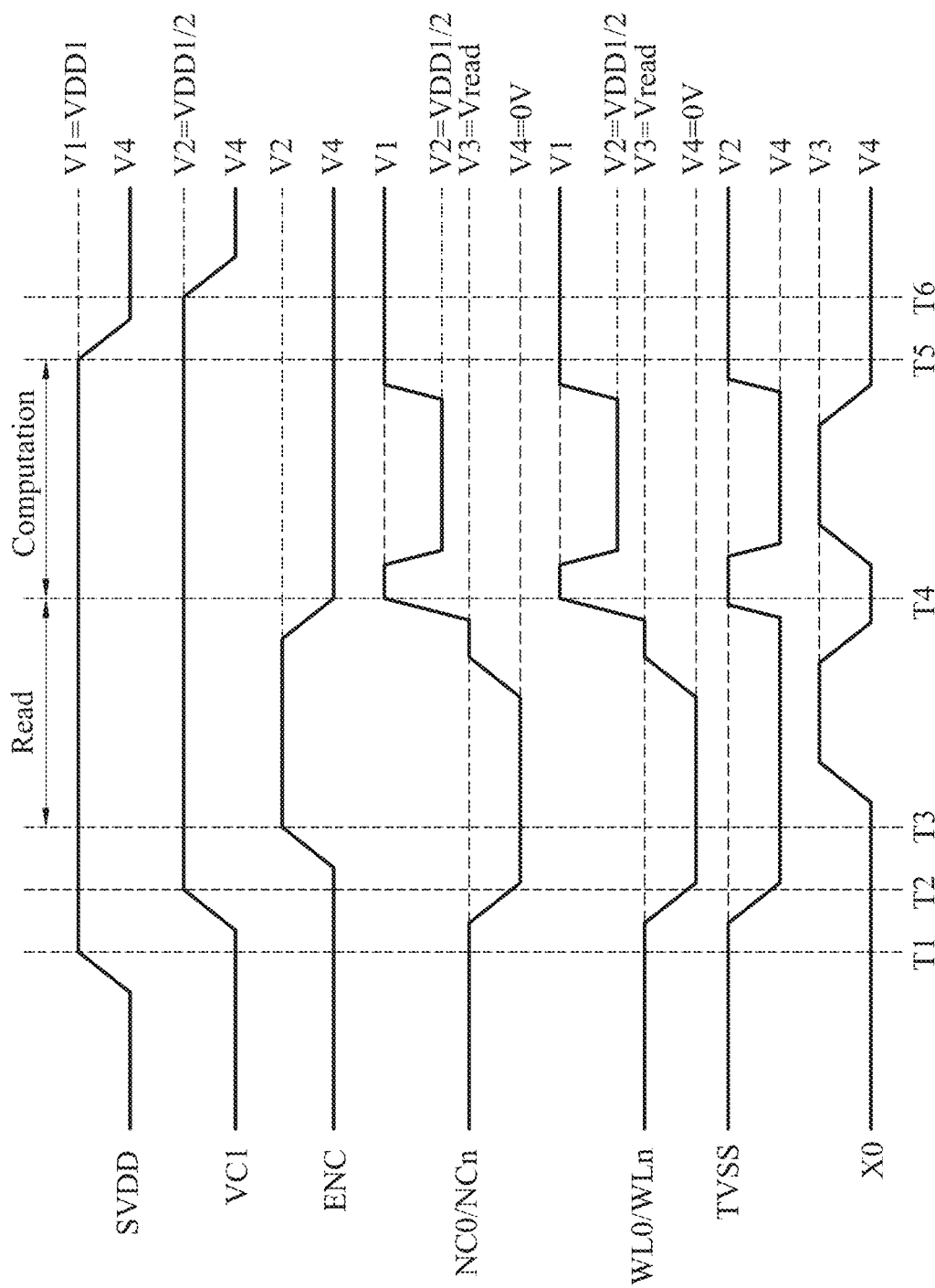
FIG. 5 is a waveform diagram illustrating signals and voltage corresponding to FIG. 4 in operation, in accordance with some embodiments of the present disclosure.

Reference is now made to both FIGS. 4-5, in which FIG. 5 is a waveform diagram illustrating signals and voltage corresponding to FIG. 4 in operation when an input bit of the input data is "1", in accordance with some embodiments of the present disclosure.

At time T1, the voltage signal SVDD having a voltage V1 equal to the supply voltage VDD1 is provided to the bias generating circuit 170 of FIG. 4.

At time T2, the bias generating circuit 170 generates the control signal VC1 having the voltage V2 to transistors 1811. In some embodiments, as shown in FIG. 5, the control signal VC1 remains the voltage V2 in both the read operation of weight data and the computation operation from time T3 to time T5.

Furthermore, one of the level shifters 1210-121n pulls down the asserted word line, for example, WL0 coupled to the memory cell MC to be read in the read operation from the read voltage Vread to a voltage V4 equal to the ground potential. The level shifters 1220-122n pull down the control signals NC0-NCn from the read voltage Vread to the voltage V4 for the read operation. In some embodiments, the control circuit 130 generates control signal to the voltage terminal TVSS to pull down the voltage thereof from the voltage V2 to the voltage V4.

During time T3 to time T4, the control circuit 130 rises the control signal ENC to have the voltage V2 based on the read operation of the memory device 40, and accordingly turns off the transistors 1812. The selected memory cell MC is accessed by turning on the transistors 111-112 in response to a corresponding one in the control signal NC0-NCn and a corresponding one in the word line signals on the word lines WL0-WLn, in which the word line signal has the ground potential. Accordingly, the weight data in the memory cell MC is transmitted to the read circuit 135.

At time T4, in a transition between the read operation and the computation operation, the absolute values of voltages across gate and source/drain terminals of the transistors 111-112 and 1811-1812 are the same. Specifically, the level shifters 1210-121n pull up voltages on the word lines WL0-WLn from the read voltage Vread to the voltage V1. The level shifters 1220-122n pull up the control signals NC0-NCn from the read voltage Vread to the voltage V1. In some embodiments, the control circuit 130 generates control signal to the voltage terminal TVSS to pull up the voltage thereof from the voltage V4 to the voltage V2.

For the computation operation in time T4 to time T5, all the memory cell MC in the memory array 110 are accessed together at the same time to generate the MAC of the input data X0-Xn and the weight data W0-Wn. Specifically, in some embodiments, the control circuit 130 pulls down the control signal ENC to the ground potential to turn on the P-type transistors 1812 to transmit the supply voltage VDD1 provided by the voltage terminal TVDD to the bit lines BL0-BLn. In some embodiments, the control circuit 130 generates control signal to the voltage terminal TVSS to pull down the voltage thereof from the voltage V2 to the voltage V4. Taking a bit data of the input data X0 having a high logic value "1" as example in FIG. 5, the level shifter 1210 further generates word line signal on the word line WL0 to have the voltage V2. Accordingly, as previously discussed with respect to FIG. 1, the memory cell MC generates an output current to a corresponding bit line according to the bit data of the input data X0 and stored bit value of the weight data.

With continued reference to FIG. 5, after time T5, the voltage signal SVDD drops to the ground potential and further pulls down the control signal VC1. The word line signals and the control signals NC0-NCn are pulled up to the voltage V1 by the level shifters 1210-121n and the level shifters 1220-122n. The control circuit 130 generates control signal to the voltage terminal TVSS to pull up the voltage thereof from the voltage V4 to the voltage V2.

Figure 6:
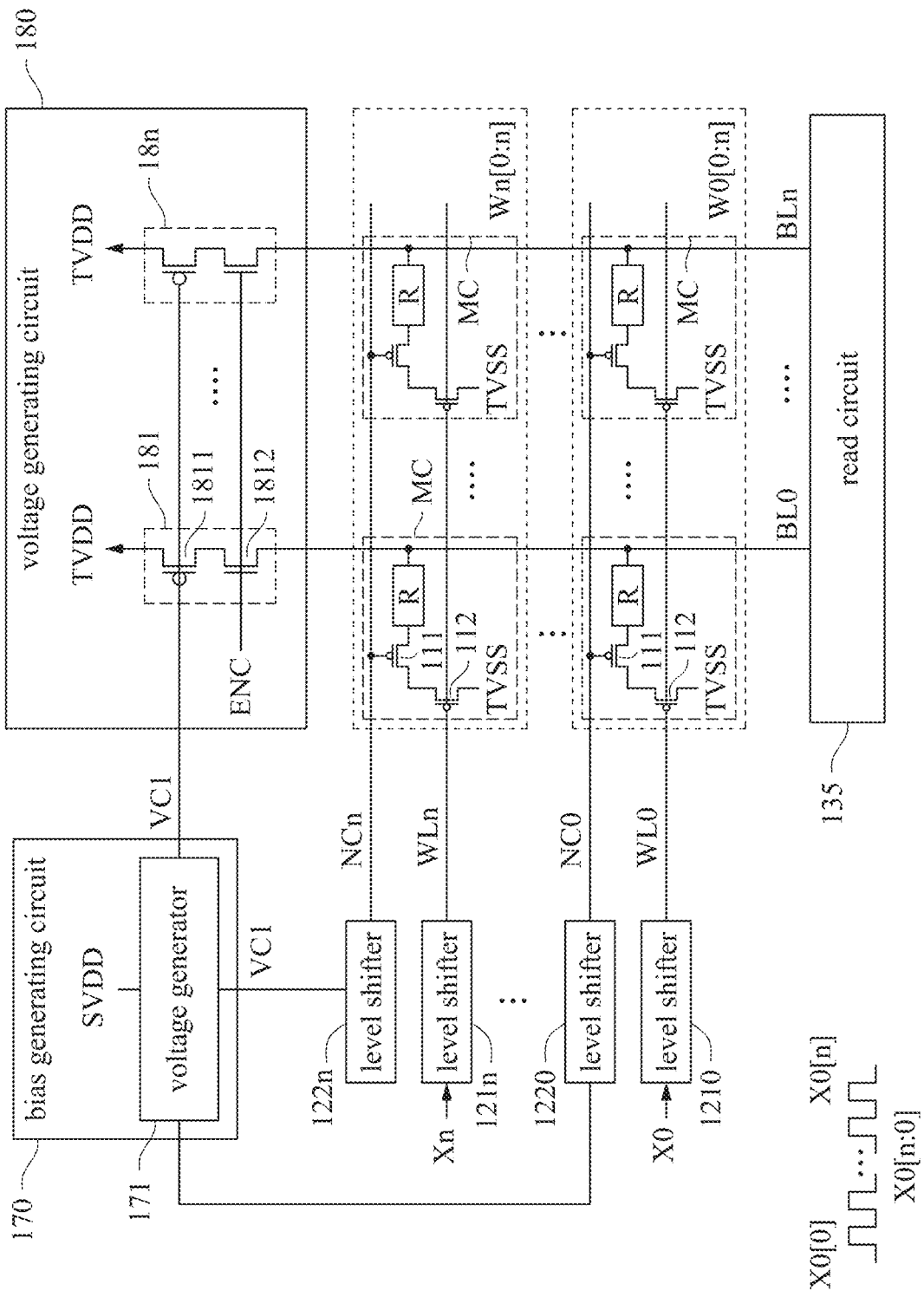
FIG. 6 is a schematic diagram of a memory device corresponding to the memory device, in accordance with some embodiments of the present disclosure.

Reference is now made to FIG. 6. FIG. 6 is a schematic diagram of a memory device 60, in accordance with some embodiments of the present disclosure. With respect to the embodiments of FIGS. 1-5, like elements in FIG. 6 are designated with the same reference numbers for ease of understanding. In some embodiments, the memory device 60 is configured with respect to, for example, the memory device 40 of FIG. 4.

Compared with the memory device 40 in FIG. 4, the transistors 1812 in the voltage generating circuit 180 of the memory device 60 are N-type transistors.

Figure 7:
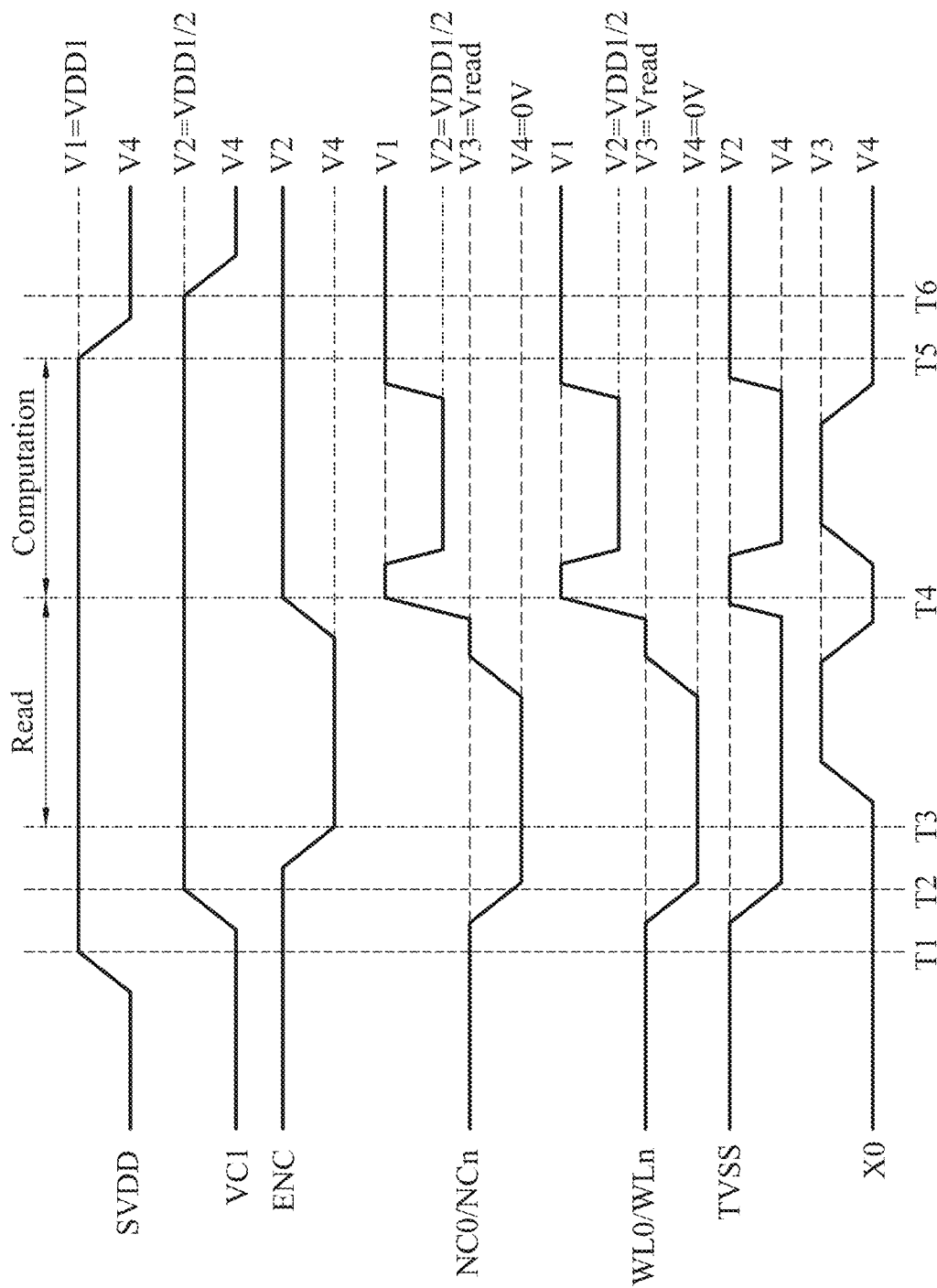
FIG. 7 is a waveform diagram illustrating signals and voltage corresponding to FIG. 6 in operation, in accordance with some embodiments of the present disclosure.

Reference is now made to both FIGS. 6-7, in which FIG. 7 is a waveform diagram illustrating signals and voltage corresponding to FIG. 6 in operation when an input bit of the input data is "1", in accordance with some embodiments of the present disclosure.

Compared with the embodiments of FIG. 5, instead of pulling up to a high voltage of the control signal ENC in the read operation and pulling down to a low voltage in the computation operation, the control circuit 130 pulls down the control signal ENC to the voltage V4 equal to a ground potential to turn off the transistors 1812, and further pulls up the control signal ENC to the voltage V2 equal to VDD1/2 to conduct the transistors 1812.

Figure 8:
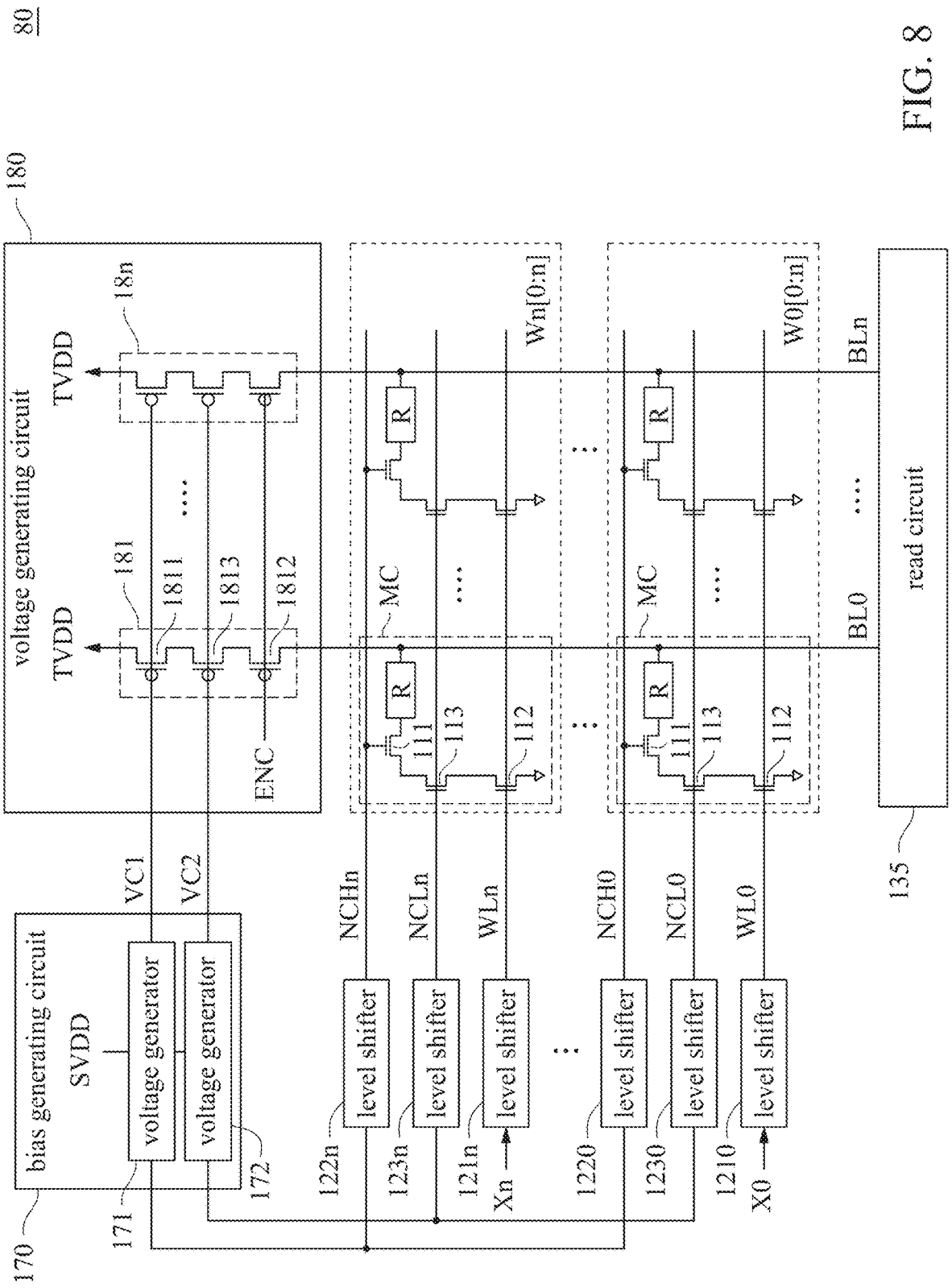
FIG. 8 is a schematic diagram of a memory device corresponding to the memory device, in accordance with some embodiments of the present disclosure.

Reference is now made to FIG. 8. FIG. 8 is a schematic diagram of a memory device 60, in accordance with some embodiments of the present disclosure. With respect to the embodiments of FIGS. 1-7, like elements in FIG. 8 are designated with the same reference numbers for ease of understanding. In some embodiments, the memory device 20 is configured with respect to, for example, the memory device 10 of FIG. 2.

Compared with the memory device 10 in FIG. 2, instead of having two transistors 1811-1812 in one voltage divider circuit 181 and having two transistors 111-112 in one memory cell MC, each of the voltage divider circuit 181 in the memory device 80 has three transistors and each of the memory cell MC has three transistors. Specifically, a transistor 1813 is coupled in series between the transistors 1811-1812 and configured to operate in response to a control signal VC2 that is generated by a voltage generator 172 of the bias generating circuit 170 and received at a gate terminal of the transistor 1813. A transistor 113 is coupled in series between the transistors 111-112 and configured to operate in response to a corresponding one in the control signals NCL0-NCLn that is generated by a corresponding one in the level shifters 1230-123n and received at a gate terminal of the transistor 113. In some embodiments, the level shifters 1230-123n are configured with respect to, for example, the level shifters 1220-122n.

In some embodiments of FIG. 8, the voltage generator 171 and the level shifters 1220-122n are in a high voltage domain HVDD, and the level shifters 1220-122n generates the control signals NCH0-NCHn. The level shifters 1230-123n are in a middle voltage domain MVDD, and the level shifters 1230-123n generates the control signals NCL0-NCLn different from the control signals NCH0-NCHn. In some embodiments, the highest voltage level of the control signals NCH0-NCHn is higher than that of the control signals NCL0-NCLn. The level shifters 1210-121n are in a low voltage domain.

In some embodiments, as the supply voltage provided by the voltage terminal TVDD increases, for example, having a voltage VDD2 greater than the voltage VDD1 of FIGS. 1-7, to provide wider sampling range for sum currents on the bit lines, the number of series-coupled transistors in the voltage divider circuits 181 and the number of series-coupled transistors in the memory cell MC correspondingly increase, as shown in the embodiments of FIG. 8. For example, comparing to the embodiments in FIGS. 1-7 that the voltage VDD1 equals to around 1.92 Volts, the voltage VDD2 is around 2.88 Volts.

Figure 9:
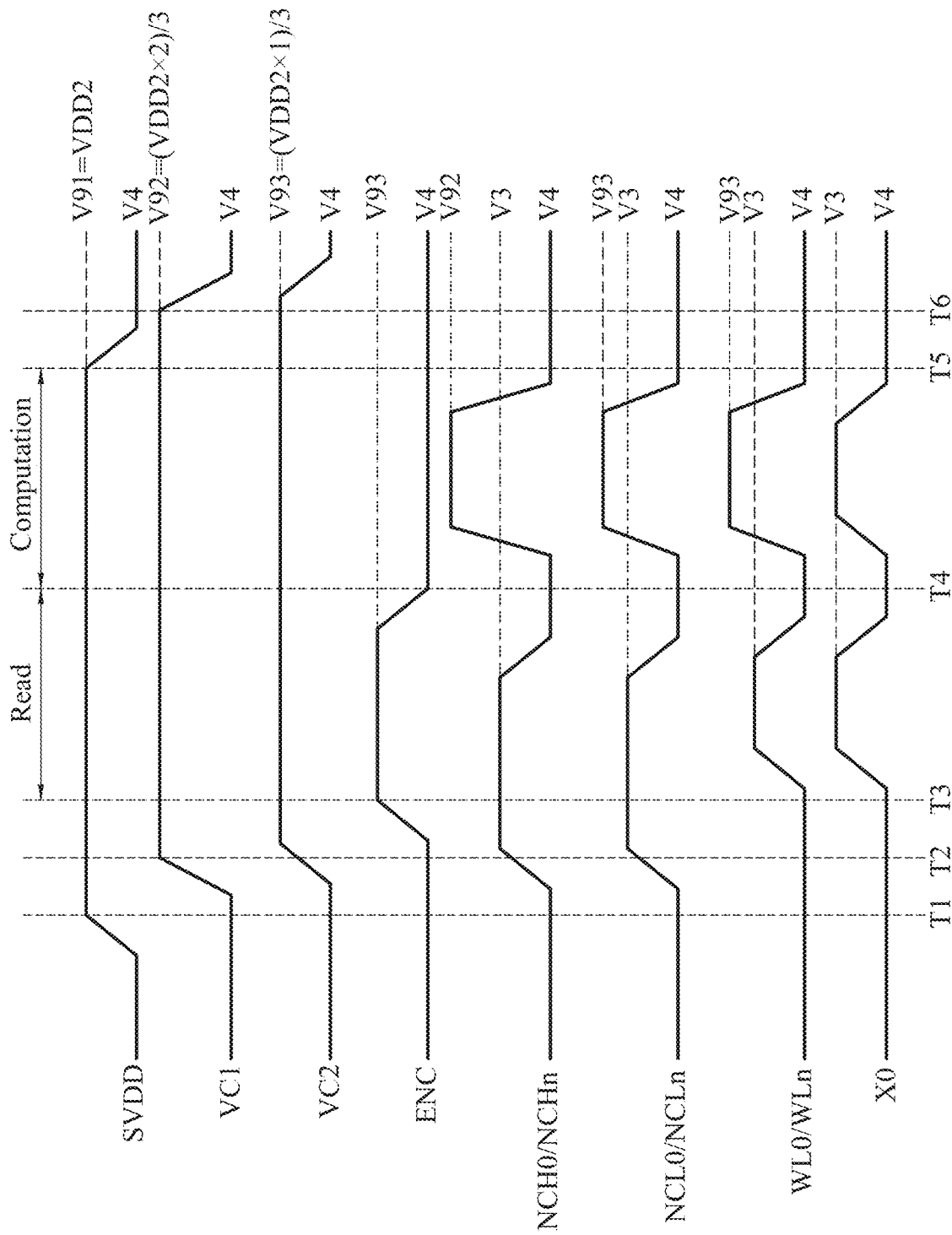
FIG. 9 is a waveform diagram illustrating signals and voltage corresponding to FIG. 8 in operation, in accordance with some embodiments of the present disclosure.

As shown in FIG. 9 which depicts a waveform diagram illustrating signals and voltage corresponding to FIG. 8 in operation when an input bit of the input data is "1", in accordance with some embodiments of the present disclosure, the voltage signal SVDD swings between a voltage V91 equal to a voltage VDD2 and the voltage V4 equal to the ground potential.

In some embodiments, the voltage generators 171-172, the level shifters 1210-121n, 1220-122n, and 1230-123n are configured to generate control signals to keep the absolute values of voltages across the gate and source/drain terminals of the transistors 1811-1813 in the voltage generating circuit 180 and of the transistors 111-113 in the memory cell MC the same with each other in the computation operation.

Specifically, as shown in the computation operation of FIG. 9, the control circuit 130 pulls down the control signal ENC from a voltage V93 equal to VDD2/3 (e.g., around 0.96 Volts) to the voltage V4 and transmits the control signal ENC to turn on the transistors 1812. The voltage generator 171 generates the control signal VC1 having a voltage V92 equal to VDD2×2/3 (e.g., around 1.92 Volts) to conduct the transistors 1811. The voltage generator 172 generates the control signal VC2 having the voltage V93 to conduct the transistors 1813.

Furthermore, the level shifters 1220-122n pull up, in response to signals (e.g., the control signal VC1) from the voltage generator 171, the control signals NCH0-NCHn to have the voltage V92 to turn on the transistors 111 while the level shifters 1210-121n and 1223-123n pull up the word line signals on the word lines WL0-WLn and the control signals NCL0-NCLn to have the voltage V93 smaller than the voltage V92 to turn on the transistors 112 and 113. In some embodiments, the level shifters 1230-123n operate in response to signals (e.g., the control signal VC2) from the voltage generator 172.

Figure 10:
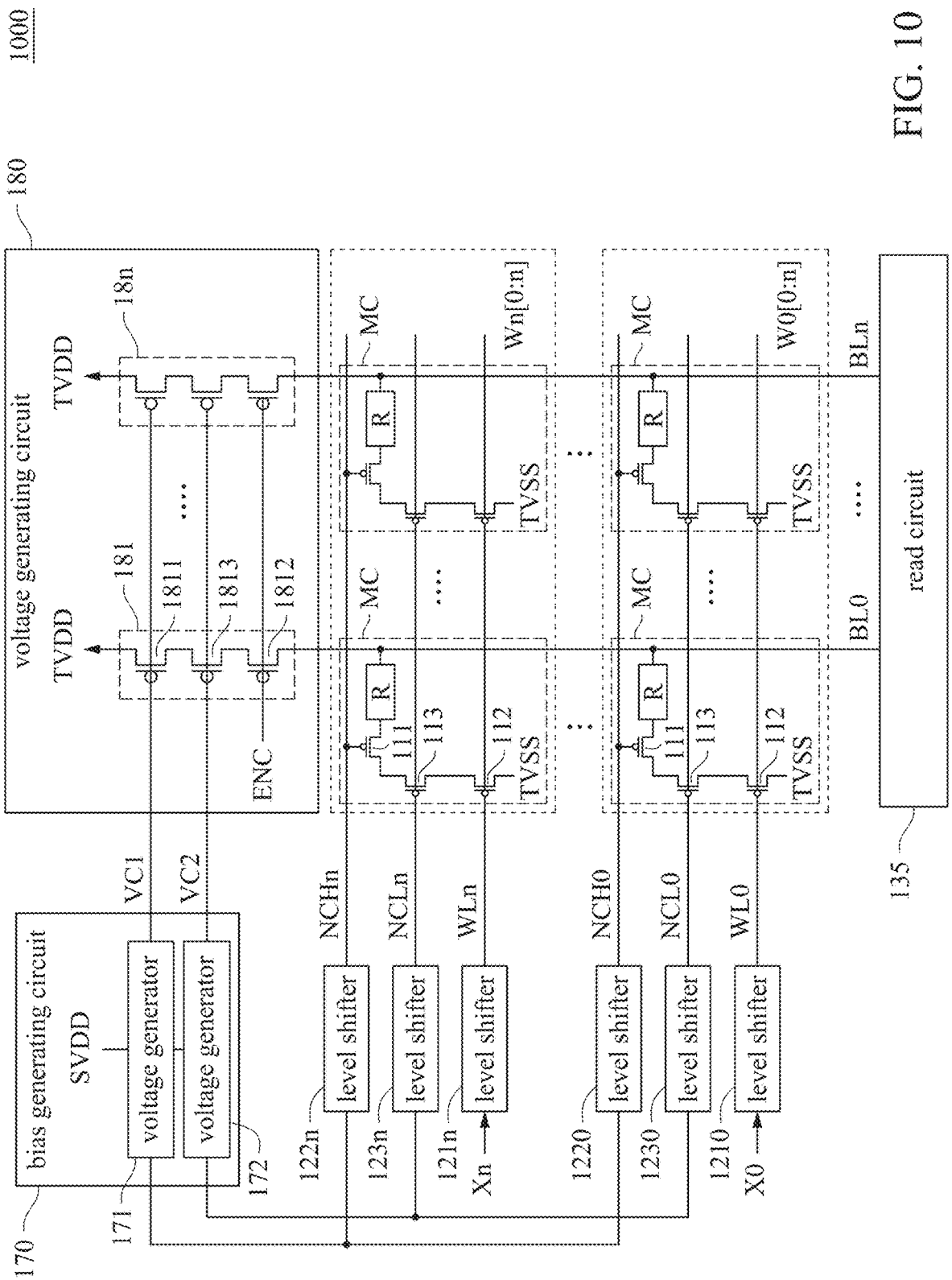
FIG. 10 is a schematic diagram of a memory device corresponding to the memory device, in accordance with some embodiments of the present disclosure.

Reference is now made to FIG. 10. FIG. 10 is a schematic diagram of a memory device 1000, in accordance with some embodiments of the present disclosure. With respect to the embodiments of FIGS. 1-9, like elements in FIG. 10 are designated with the same reference numbers for ease of understanding. In some embodiments, the memory device 1000 is configured with respect to, for example, the memory device 80 of FIG. 8.

Compared with the memory device 80 in FIG. 8, the transistors 111-113 in the memory array 110 of the memory device 1000 are P-type transistors. In some embodiments of FIG. 10, the voltage signal SVDD is transmitted to the level shifters 1210-121n, 1220-122n, and 1230-123n to provide the supply voltage VDD2 in the computation operation.

Figure 11:
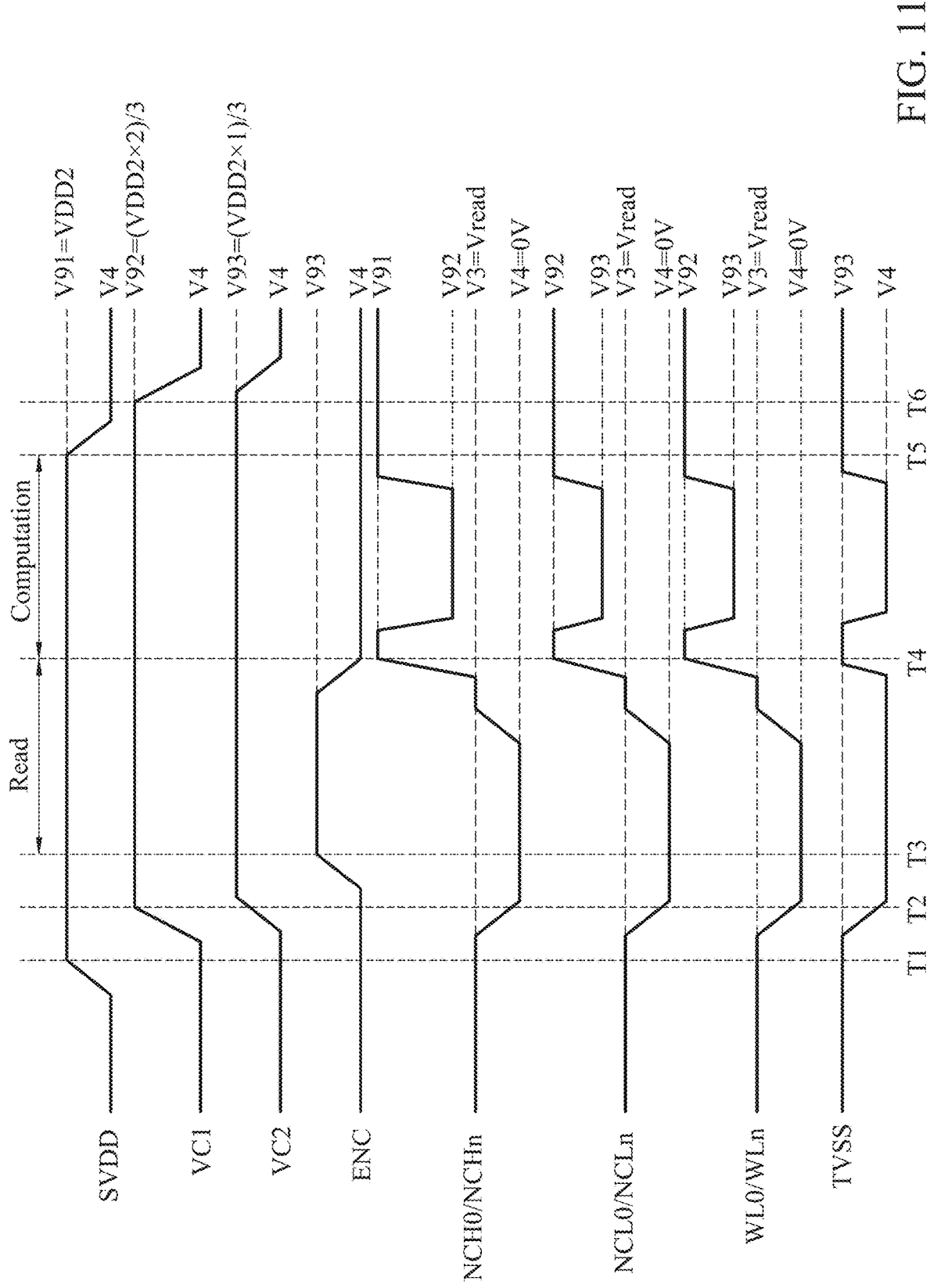
FIG. 11 is a waveform diagram illustrating signals and voltage corresponding to FIG. 10 in operation, in accordance with some embodiments of the present disclosure.

Reference is now made to both FIGS. 10-11, in which FIG. 11 is a waveform diagram illustrating signals and voltage corresponding to FIG. 10 in operation when an input bit of the input data is "1", in accordance with some embodiments of the present disclosure.

At time T1, the voltage signal SVDD having the voltage V91 equal to the supply voltage VDD2 is provided to the bias generating circuit 170 of FIG. 10.

At time T2, the voltage generator 171 generates the control signal VC1 having the voltage V92 to transistors 1811, and the voltage generator 172 generates the control signal VC2 having the voltage V93 to transistors 1813. In some embodiments, as shown in FIG. 11, the control signals VC1 and VC2 do not change in both the read operation of weight data and the computation operation from time T3 to time T5.

Furthermore, one of the level shifters 1210-121n pulls down the asserted word line, for example, WL0 coupled to the memory cell MC to be read in the read operation from the read voltage Vread to a voltage V4. The level shifters 1220-122n and 1230-123n pull down the control signals NCH0-NCHn and NCL0-NCLn from the read voltage Vread to the voltage V4 for the read operation. In some embodiments, the control circuit 130 generates control signal to the voltage terminal TVSS to pull down the voltage thereof from the voltage V93 to the voltage V4.

During time T3 to time T4, the control circuit 130 rises the control signal ENC to have the voltage V93 based on the read operation of the memory device 80, and accordingly turns off the transistors 1812. The selected memory cell MC is accessed by turning on the transistors 111-113 in response to a corresponding one in the control signals NCH0-NCHn, NCL0-NCLn and a corresponding one in the word line signals on the word lines WL0-WLn that have the voltage V4. Accordingly, the weight data in the memory cell MC is transmitted to the read circuit 135.

At time T4, in a transition between the read operation and the computation operation, the absolute values of voltages across gate and source/drain terminals of the transistors 111-113 and 1811-1813 are the same. Specifically, the level shifters 1210-121n and 1230-123n pull up voltages on the word lines WL0-WLn and the control signals NCL0-NCLn from the read voltage Vread to the voltage V93 separately. The level shifters 1220-122n pull up the control signals NCH0-NCHn from the read voltage Vread to the voltage V91. In some embodiments, the control circuit 130 generates control signal to the voltage terminal TVSS to pull up the voltage thereof from the voltage V4 to the voltage V93.

For the computation operation in time T4 to time T5, the absolute values of voltages across gate and source/drain terminals of the transistors 111-113 and 1811-1813 are the same. All the memory cell MC in the memory array 110 are accessed together at the same time to generate the MAC of the input data X0-Xn and the weight data W0-Wn. Specifically, in some embodiments, the control circuit 130 pulls down the control signal ENC to the ground potential to turn on the P-type transistors 1812 to transmit the supply voltage VDD2 provided by the voltage terminal TVDD to the bit lines BL0-BLn. In some embodiments, the control circuit 130 generates control signal to the voltage terminal TVSS to pull down the voltage thereof from the voltage V93 to the voltage V4. The level shifters 1220-122n pull down the control signal NCH0-NCHn from the voltage V91 to the voltage V92, and the level shifters 1230-123n pull down the control signal NCL0-NCLn from the voltage V92 to the voltage V93. Taking a bit data of the input data X0 having a high logic value "1" as example in FIG. 10, the level shifter 1210 further generates word line signal on the word line WL0 to have the voltage V93. Accordingly, as previously discussed with respect to FIG. 1, the memory cell MC generates an output current to a corresponding bit line according to the bit data of the input data X0 and stored bit value of the weight data.

With continued reference to FIG. 11, after time T5, the voltage signal SVDD drops to the ground potential and further pulls down the control signals VC1-VC2. The word line signals and the control signals NCL0-NCLn are pulled up to the voltage V92 by the level shifters 1210-121n and the level shifters 1230-123n, and the control signals NCH0-NCHn are pulled up to the voltage V91 by the level shifters 1220-122n. The control circuit 130 generates control signal to the voltage terminal TVSS to pull up the voltage thereof from the voltage V4 to the voltage V93.

Figure 12:
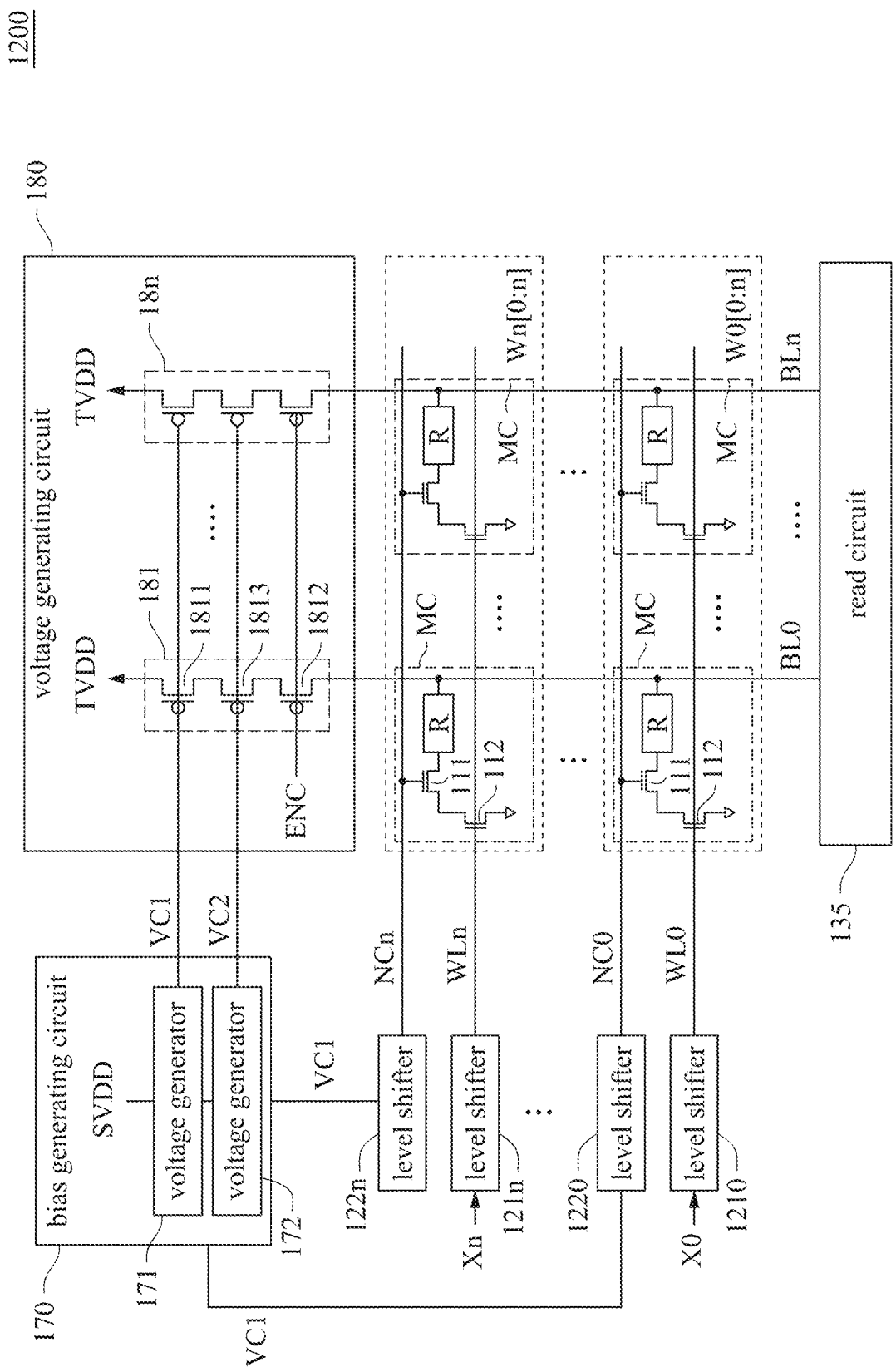
FIG. 12 is a schematic diagram of a memory device corresponding to the memory device, in accordance with some embodiments of the present disclosure.

Reference is now made to FIG. 12. FIG. 12 is a schematic diagram of a memory device 1200 corresponding to the memory device, in accordance with some embodiments of the present disclosure. With respect to the embodiments of FIGS. 1-11, like elements in FIG. 12 are designated with the same reference numbers for ease of understanding. In some embodiments, the memory device 1200 is configured with respect to, for example, the memory device 80 of FIG. 8.

Compared with the embodiments of FIG. 8, instead of having symmetric number of transistors in each of the memory cells MC and the voltage divider circuits 181, the number N1 of transistors 111-112 in the memory cell MC is smaller than the number N2 of transistors 1811-1813 in the voltage divider circuit 181.

In the computation operation according to some embodiments of FIG. 12, the voltage levels of the control signals VC1-VC2 are different from the control signals NC0-NCn and word line signals on the word lines WL0-WLn. Specifically, in some embodiments, a supply voltage VDD3 is provided by the voltage terminal TVDD and the highest voltage of the voltage signal SVDD is the voltage VDD3. For computation operation, the voltage generator 171 generates the control signal VC1 having a voltage equal to VDD3×(2/3). The voltage generator 172 generates the control signal VC2 having a voltage equal to VDD3×(1/3). When the input data, for example, X0, has bit value of "1," the word line signal on the word line, for example WL0, and the control signals NC0-NCn have a voltage equal to VDD3× (1/2).

Figure 13:
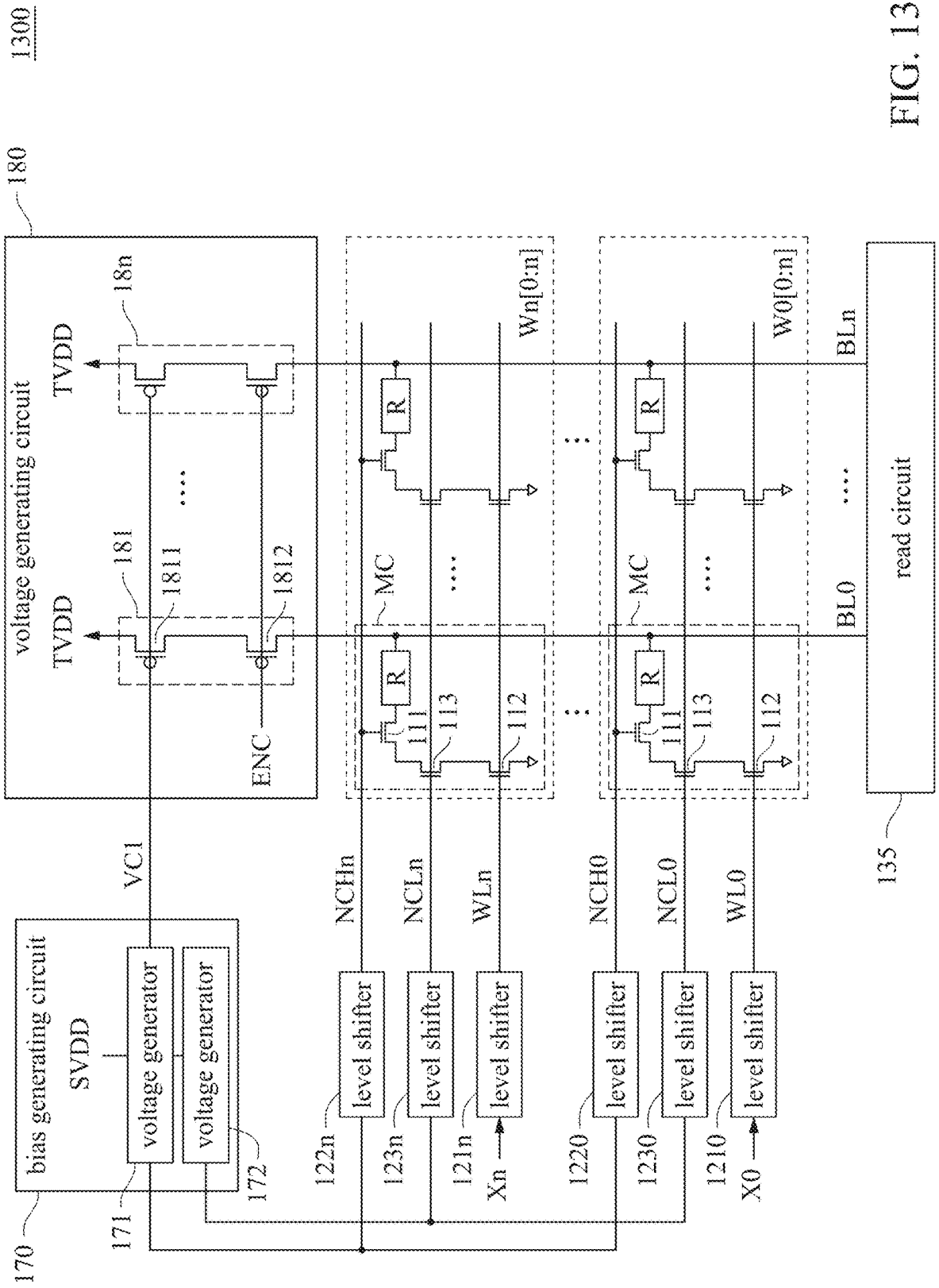
FIG. 13 is a schematic diagram of a memory device corresponding to the memory device, in accordance with some embodiments of the present disclosure.

Reference is now made to FIG. 13. FIG. 13 is a schematic diagram of a memory device 1300 corresponding to the memory device, in accordance with some embodiments of the present disclosure. With respect to the embodiments of FIGS. 1-12, like elements in FIG. 13 are designated with the same reference numbers for ease of understanding. In some embodiments, the memory device 1300 is configured with respect to, for example, the memory device 10 of FIG. 2.

Compared with the embodiments of FIG. 2, instead of having symmetric number of transistors in each of the memory cells MC and the voltage divider circuits 181, the number N1 of transistors 111-113 in the memory cell MC is greater than the number N2 of transistors 1811-1812 in the voltage divider circuit 181.

In the computation operation according to some embodiments of FIG. 13, the voltage levels of the control signal VC1 are different from the control signals NCH0-NCHn, NCL0-NCLn and word line signals on the word lines WL0-WLn. Specifically, in some embodiments, a supply voltage VDD4 is provided by the voltage terminal TVDD and the highest voltage of the voltage signal SVDD is the voltage VDD4. For computation operation, the voltage generator 171 generates the control signal VC1 having a voltage equal to VDD4×(1/2). When the input data, for example, X0, has bit value of "1," the word line signal on the word line, for example WL0, and the control signals NCL0-NCLn generated by the level shifters 1230-123n have a voltage equal to VDD4×(1/3). The control signals NCH0-NCHn generated by the level shifters 1220-122n have a voltage equal to (VDD4×2)×(1/3).

The configurations of FIGS. 12-13 are given for illustrative purposes. Various implements are within the contemplated scope of the present disclosure. For example, in some embodiments, the transistors 111-113 are implemented by the P type transistors and configured with respect to the embodiments of FIG. 4 and FIG. 10.

Figure 14:
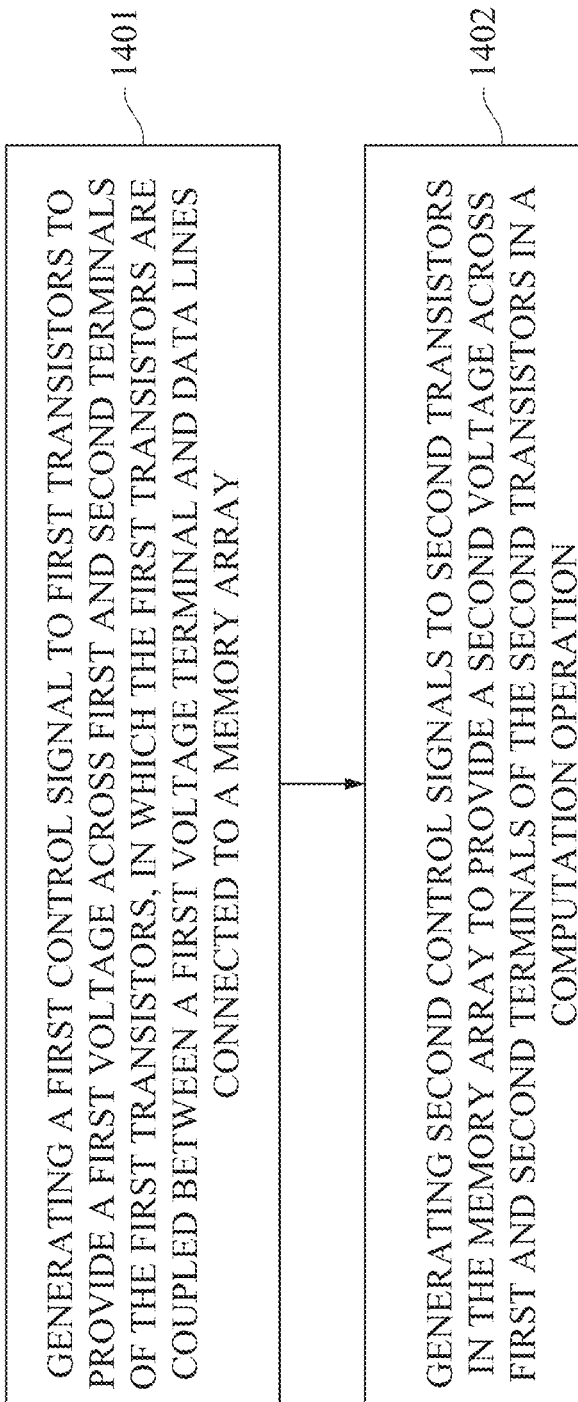
FIG. 14 is a flowchart diagram of a method for operating a memory device, in accordance with some embodiments of the present disclosure.

Reference is now made to FIG. 14. FIG. 14 is a flowchart diagram of a method 1400 for operating the memory device 10, 40, 60, 80, 1000, 1200, or 1300, in accordance with some embodiments. It is understood that additional operations can be provided before, during, and after the processes shown by FIG. 14, and some of the operations described below can be replaced or eliminated, for additional embodiments of the method 1400. The order of the operations/processes may be interchangeable. Throughout the various views and illustrative embodiments, like reference numbers are used to designate like elements. The method 1400 includes operations 1401-1402 that are described below with reference to the memory device 10 corresponding to FIG. 2.

In operation 1401, as shown in FIG. 2, the bias generating circuit 170 generates the control signal VC1 to the transistors 1811 to provide a voltage, equal to the voltage V2, across gate and source/drain terminals of the transistors 1811. As shown in FIG. 3A, in the computation operation, the control signal VC1 has the voltage V2.

The method 1400 further includes operations of turning on, in response to the control signal ENC having the voltage V4, the transistors 1812 in the computation operation to transmit the supply voltage VDD1 from the voltage terminal TVDD.

In operation 1402, the level shifters 1220-122n generate the control signals NC0-NCn to the transistors 111 in the memory array 110 to provide a voltage, equal to the voltage V2, across gate and source/drain terminals of the transistors 111 in the computation operation.

The method 1400 further includes operations of generating a word line signal on the word line WL0 according to an input data X0 of the CIM operation. In some embodiments, when the bit value of the input data X0 equals to "1," the voltage of the word line signal equals to the voltage V2, as shown in FIG. 3A.

A memory device is provided and including a memory array including multiple memory cells each including a memory unit; and a first number of first transistors coupled in series between the memory unit and a first voltage terminal. The memory device further includes a voltage generating circuit coupled between the memory array and a second voltage terminal. The voltage generating circuit includes multiple voltage divider circuits each including a second number of second transistors coupled in series to a corresponding one in multiple data lines to a corresponding column of the memory cells.

In some embodiments, one, having a terminal coupled to the first voltage terminal, of the first transistors is configured to operate in response to a word line signal generated according to an input data of a computing-in-memory (CIM) operation.

In some embodiments, another, having a terminal coupled to the memory unit, of the first transistors is configured to operate in response to a control signal having a voltage equal or higher than the word line signal in a computation operation of the CIM operation.

In some embodiments, the second transistors are configured to operate in response to different control signals.

In some embodiments, a first one, having a terminal coupled to the second voltage terminal, of the second transistors is configured to conduct in response to a first control signal in both of a computation operation and a read operation of the memory array.

In some embodiments, a second one, having a terminal coupled to the memory unit, of the second transistors is configured to be turned on in response to a second control signal in the computation operation. In the computation operation voltages of the first control signal and the second control signal are substantially different from each other.

In some embodiments, a third one, coupled between the first and second ones of the second transistors is configured to conduct in response to a third control signal in both of the computation operation and the read operation of the memory array. In the computation operation voltages of the second control signal and the third control signal are substantially different from each other.

In some embodiments, the first number is different from the second number.

In some embodiments, the first number of the first transistors are of a first conductivity type, and the second number of the second transistors are of a second conductivity type different from the first conductivity type.

In some embodiments, the first number of the first transistors have different conductivity types.

In some embodiments, the memory device further includes a bias generating circuit configured to generate a first control signal having a first voltage to a first one of the second transistors in each of the voltage divider circuits in a computation operation. A second one of the second transistors is configured to be turned on in response to a second control signal having a second voltage different from the first voltage in the computation operation.

In some embodiments, the memory device further includes multiple first level shifters each coupled to first ones of the first transistors, in the memory cells, arranged in a corresponding row of the memory array, and configured to generate third control signals having a third voltage equal to the first voltage.

In some embodiments, the memory device further includes multiple second level shifters each coupled to second ones of the first transistors in the memory cells, and configured to generate fourth control signals having a fourth voltage smaller than the third voltage.

Also disclosed is a memory device. The memory device includes multiple memory cells each including a memory unit, a first transistor, and a second transistor that are coupled in series, and configured to store weight data for a compute-in-memory (CIM) operation; and multiple voltage divider circuits each including a third transistor and a fourth transistor that are coupled in series to a corresponding column of the memory cells through a corresponding data line. In a computation operation of the CIM operation, each of the voltage divider circuits is configured to provide a first voltage to the corresponding data line in response to a first control signal received by a gate terminal of the third transistor and a second control signal that is received by a gate terminal of the fourth transistor and different from the first control signal, In some embodiments, in the computation operation of the CIM operation the plurality of memory cells are configured to be accessed in response to a third control signal to the first transistor and a fourth control signal to the second transistor. A voltage level of the third control signal equals to a voltage level of the fourth control signal.

In some embodiments, a voltage level of the first control signal is greater than a voltage level of the second control signal.

Also disclosed is a method of operating a memory device. The method includes: generating a first control signal to multiple first transistors to provide a first voltage across first and second terminals of the first transistors, wherein the first transistors are coupled between a first voltage terminal and multiple data lines connected to a memory array; and generating multiple second control signals to multiple second transistors in the memory array to provide a second voltage across first and second terminals of the second transistors in a computation operation. The second transistors are coupled to the data lines through multiple memory units.

In some embodiments, the method further includes turning on, in response to a third control signal having a third voltage, multiple third transistors in the computation operation to transmit a supply voltage from the first voltage terminal. Each of the third transistors is coupled between a corresponding one in the first transistors and a corresponding one of the data lines. The third voltage is smaller than to the first voltage.

In some embodiments, the method further includes generating a word line signal according to an input data of a compute-in-memory (CIM) operation. A voltage of the word line signal equals to the second voltage.

In some embodiments, the first voltage and the second voltage are the same.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a memory array comprising a plurality of memory cells each comprising:
      a memory unit; and
      a first number of first transistors coupled in series between the memory unit and a first voltage terminal; and
   a voltage generating circuit coupled between the memory array and a second voltage terminal, and comprising:
      a plurality of voltage divider circuits each comprising a second number of second transistors coupled in series to a corresponding one of a plurality of data lines, each data line of the plurality of data lines coupled to a corresponding column of the memory cells, wherein the second number is greater than one, and the second transistors are configured to operate in response to different control signals.

2. The memory device of claim 1, wherein one, having a terminal coupled to the first voltage terminal, of the first transistors is configured to operate in response to a word line voltage generated according to input data of a computing-in-memory (CIM) operation.

3. The memory device of claim 2, wherein another, having a terminal coupled to the memory unit, of the first transistors is configured to operate in response to a control signal having a voltage equal to or higher than the word line voltage in a computation operation of the CIM operation.

4. The memory device of claim 1, wherein a first one, having a terminal coupled to the second voltage terminal, of the second transistors is configured to conduct in response to a first control signal in both of a computation operation and a read operation of the memory array.

5. The memory device of claim 4, wherein a second one, having a terminal coupled to the memory unit, of the second transistors is configured to be turned on in response to a second control signal in the computation operation,
   wherein in the computation operation voltages of the first control signal and the second control signal are substantially different from each other.

6. The memory device of claim 5, wherein a third one, coupled between the first and second ones of the second transistors is configured to conduct in response to a third control signal in both of the computation operation and the read operation of the memory array,
   wherein in the computation operation voltages of the second control signal and the third control signal are substantially different from each other.

7. The memory device of claim 4, wherein a second one, having a terminal coupled to the memory units, of the second transistors is configured to be turned on in response to a second control signal in the computation operation.

8. The memory device of claim 1, wherein the first number is different from the second number.

9. The memory device of claim 1, wherein the first number of the first transistors are of a first conductivity type, and the second number of the second transistors are of a second conductivity type different from the first conductivity type.

10. The memory device of claim 1, wherein the first number of the first transistors have different conductivity types.

11. The memory device of claim 1, further comprising:
a bias generating circuit configured to generate a first control signal having a first voltage to a first one of the second transistors in each of the plurality of voltage divider circuits in a computation operation,
wherein a second one of the second transistors is configured to be turned on in response to a second control signal having a second voltage different from the first voltage in the computation operation.

12. The memory device of claim 11, further comprising:
a plurality of first level shifters each coupled to first ones of the first transistors, in the plurality of memory cells, arranged in a corresponding row of the memory array, and configured to generate third control signals having a third voltage equal to the first voltage.

13. The memory device of claim 12, further comprising:
a plurality of second level shifters each coupled to second ones of the first transistors in the plurality of memory cells, and configured to generate fourth control signals having a fourth voltage smaller than the third voltage.

14. A memory device, comprising:
a plurality of memory cells each comprising a memory unit, a first transistor, and a second transistor that are coupled in series, and configured to store weight data for a compute-in-memory (CIM) operation; and
a plurality of voltage divider circuits each comprising a third transistor and a fourth transistor that are coupled in series to a corresponding column of the memory cells through a corresponding data line,
wherein in a computation operation of the CIM operation, each of the plurality of voltage divider circuits is configured to provide a first voltage to the corresponding data line in response to a first control signal received by a gate terminal of the third transistor and a second control signal that is received by a gate terminal of the fourth transistor and different from the first control signal.

15. The memory device of claim 14, wherein in the computation operation of the CIM operation the plurality of memory cells are configured to be accessed in response to a third control signal to the first transistor and a fourth control signal to the second transistor, wherein a voltage level of the third control signal equals to a voltage level of the fourth control signal.

16. The memory device of claim 14, wherein a voltage level of the first control signal is greater than a voltage level of the second control signal.

17. A method, comprising:
generating a first control signal to a plurality of first transistors to provide a first voltage across first and second terminals of the plurality of first transistors, wherein the plurality of the first transistors are coupled between a first voltage terminal and a plurality of data lines connected to a memory array;
generating a third control signal, different from the first control signal, to a plurality of third transistors to transmit a voltage from the first voltage terminal, wherein each of the plurality of third transistors is coupled between a corresponding one of the plurality of first transistors and a corresponding one of the plurality of data lines; and
generating a plurality of second control signals to a plurality of second transistors in the memory array to provide a second voltage across first and second terminals of the plurality of second transistors in a computation operation,
wherein the second transistors are coupled to the plurality of data lines through a plurality of memory units.

18. The method of claim 17, further comprising:
turning on, in response to the third control signal having a third voltage, the plurality of third transistors in the computation operation to transmit a supply voltage from the first voltage terminal,
wherein the third voltage is smaller than the first voltage.

19. The method of claim 18, further comprising:
generating a word line signal according to an input data of a compute-in-memory (CIM) operation,
wherein a voltage of the word line signal equals to the second voltage.

20. The method of claim 17, wherein the first voltage and the second voltage are the same.

* * * * *